United States Patent [19]

Bour et al.

[11] 4,362,862

[45] Dec. 7, 1982

[54] PREPARATION OF POLY-2-PYRROLIDONE WITH N-(2-CAPROLACTIM)-CAPROLACTAM ACCELERATOR

[75] Inventors: Edmond H. J. P. Bour; Jean M. M. Warnier; Johannes A. L. Brouwers, all of Geleen, Netherlands

[73] Assignee: Stamicarbon, B.V., Geleen, Netherlands

[21] Appl. No.: 230,796

[22] Filed: Feb. 2, 1981

Related U.S. Application Data

[62] Division of Ser. No. 4,475, Jan. 18, 1979, abandoned.

[30] Foreign Application Priority Data

Jan. 18, 1978 [NL] Netherlands ........................ 7800587

[51] Int. Cl.$^3$ .............................................. C08G 69/24

[52] U.S. Cl. .................................... 528/314; 528/315; 528/317; 528/327

[58] Field of Search ............... 528/314, 315, 312, 326, 528/317

[56] References Cited

U.S. PATENT DOCUMENTS

| | | | |
|---|---|---|---|
| 3,040,004 | 6/1962 | Glickman et al. | 528/314 |
| 3,052,654 | 9/1962 | Roth et al. | 528/326 |
| 3,141,006 | 7/1968 | Kohan | 528/326 |
| 3,484,414 | 12/1969 | Joris et al. | 528/326 |
| 3,647,764 | 3/1972 | Sargent | 528/326 |
| 3,721,652 | 3/1973 | Barnes | 528/314 |
| 3,842,047 | 10/1974 | Pustaszeri | 528/326 |
| 3,850,890 | 11/1974 | Ciaperoni | 528/326 |
| 3,875,147 | 4/1975 | Choi | 528/326 |
| 3,935,171 | 1/1976 | Ciaperoni et al. | 528/326 |
| 4,017,465 | 4/1977 | Bacsrai | 528/326 |
| 4,076,696 | 2/1978 | Neafsey | 528/326 |
| 4,105,645 | 8/1978 | Barnes et al. | 528/323 |

FOREIGN PATENT DOCUMENTS 1336048 11/1973 United Kingdom .

*Primary Examiner*—Harold D. Anderson

[57] ABSTRACT

A new type of poly-2-pyrrolidone suitable for melt spinning and a process for its preparation. The new poly-2-pyrrolidone is characterized in that the polymer in the virgin state has a relative viscosity (1 gram of polymer in 100 ml of 96% sulphuric acid at 20° C.) of between 2.2 and 7.0, shows a weight loss of less than 5% by weight when heated from 20° C. to the onset temperature of thermal degradation at a rate 4° C. per minute, the ratio between the relative viscosities after and before melt spinning ranges between 0.50:1 and 0.95:1, and the relative viscosity after melt spinning is at least 1.90. The new poly-2-pyrrolidone is prepared by polymerization of 2-pyrrolidone in the presence of an anionic catalyst and an accelerator wherein N-(2-caprolactim)-caprolactam is used as the accelerator in an amount of between 0.05 and 5.0 mole percent relative to the monomer, and the polymerization is carried out at a temperature of between about 25° and 70° C. until a relative viscosity of at least 2.2 is obtained.

5 Claims, No Drawings

PREPARATION OF POLY-2-PYRROLIDONE WITH N-(2-CAPROLACTIM)-CAPROLACTAM ACCELERATOR

This is a division of application Ser. No. 4,475, filed Jan. 18, 1979, now abandoned.

BACKGROUND OF THE INVENTION

The invention relates to a new type of polypyrrolidone that is suitable for spinning from the melt, and a process for its preparation by anionic polymerization of 2-pyrrolidone.

It has been known since 1951 that polypyrrolidone (also known as nylon-4) can be produced by the polymerization of pyrrolidone in the presence of an anionic catalyst and a polymerization accelerator. Most generally, alkali lactamates have been used as the catalyst. However, in the period between 1951 and 1968, hundreds of different compounds suitable as accelerators have been described in the literature, and by the end of the 1960's the accelerators most generally used were acyl lactams. However, the polymers obtained using these prior catalysts and accelerators tended to decompose when in a molten state, and thus were not stable enough to be spun from the melt. This was a critical deficiency inasmuch as the main use of nylon-4 is as a fiber, and melt spinning is the method of fiber production most generally utilized.

It has subsequently been proposed to use carbon dioxide or sulphur dioxide as an accelerator (see U.S. Pat. Nos. 3,721,652 and 4,105,645). Use of these accelerators in 2-pyrrolidone polymerization yields a nylon-4 having a sufficiently high thermal stability to enable it to be spun continuously from the melt provided that a polymer having a very high molecular weight is prepared. The polymers with a lower molecular weight, e.g. below 80,000, prepared with these accelerators are much less stable and unsuitable for melt-spinning. This stability presumably results from the relatively narrow molecular weight distribution and the very high average molecular weight of these polymers. The accelerators $CO_2$ and $SO_2$ always lead to polymers of very high molecular weight, unless a very short polymerization time or an impure monomer are used.

In order to increase the thermal stability of the polymer, all efforts were directed to the production of nylon-4 with a high molecular weight, of, for instance, 200,000 or even over 350,000, which molecular weights correspond to a relative viscosity of from about 15 to 35, measured at 20° C. on a solution of 1 gram of polymer in 100 ml of 96% sulphuric acid. (The term "relative viscosity" as used herein shall be understood to mean the viscosity of a solution of 1 gram of polypyrrolidone in 100 ml of 96% sulphuric acid at 20° C., divided by the viscosity of the solvent at 20° C.) However, when polymers of such high molecular weight were spun, it was found that the relative viscosity of the spun polymer ranged only between about 2.0 and 3.5, which shows that considerable degradation or redistribution of the polymer chains occurs during melt spinning. Consequently, the high molecular weight of the unspun polymer does not result in the formulation of threads of polymer having a high molecular weight.

Furthermore, the high molecular weight of the starting unspun polymer is itself a disadvantage, since the high viscosity interferes with spinning, and the degree of degradation of the polymer to a lower molecular weight is strongly influenced by the conditions during spinning. Thus, small fluctuations in the spinning conditions, particularly small variation in the temperature of the polymer melt, may give rise to uncontrolled variations in the molecular weight of the spun product.

It is indicated in the literature that it might be possible to overcome this problem by subjecting the polymer prior to spinning, to a treatment such as a thermal treatment, which considerably reduces the molecular weight from, for example, 475,000 down to 60,000. This pretreated polymer can then be spun, preferably in the presence of a stabilizer or spinning agent. Such pretreatment tends however to broaden the molecular weight distribution.

BRIEF SUMMARY OF THE INVENTION

Applicants have now found a new type of poly-2-pyrrolidone that can be successfully spun from the melt without any such pretreatment, and without the disadvantages and extreme degradation in molecular weight experienced in the prior art attempts to spin the high molecular weight polymers. This new type of poly-2-pyrrolidone can be spun from the melt into a white thread, has a relative viscosity of between 2.2 and 7.0 in the unspun virgin state, shows a loss in weight of less than 5% by weight when heated from 20° C. to the onset of thermal degradation at a rate of 4° C. per minute, while the ratio between the relative viscosities after and before melt spinning ranges between 0.50:1 and 0.95:1, and the relative viscosity after melt spinning is at least 1.90.

This new polymer can be prepared by the polymerization of 2-pyrrolidone with an anionic catalyst and N-(2-caprolactim)-caprolactam as an accelerator at a temperature of between 20° and 70° C. until a polymer with a relative viscosity of between 2.20 and 7.0 has been obtained. The polymerization can be carried out either in mass (bulk) or in an inert liquid vehicle.

DESCRIPTION OF PREFERRED EMBODIMENT

The term "virgin polymer" or polymer in the "virgin state" as used herein shall be understood to mean the ground, washed and dried polymer that has not been subjected to a thermal treatment other than drying at a temperature of at least 50° C. below the melting point of the polymer, and to which no additives have been added. The term "melt spinning" as used herein shall be understood to mean melt spinning effected in the usual manner at a temperature of between about 265° C. and 280° C., and preferably at a temperature of about 270° C. For purposes of determining the characteristics of the polymer, use may be made of laboratory melt spinning apparatus, such as the Laborschmelzspinnmaschine LSM. Ex 13/24 D sold by Fourné GmbH at Bonn.

Preferably this new type of nylon-4 should have a relative viscosity prior to spinning of between 3.0 and 6.0 and have a ratio between the relative viscosities after and before spinning of between 0.6:1 and 0.95:1. These polymers are very suitable for most textile applications. But particular preference is given to those polymers that have a molecular weight and thermal stability such that the relative viscosity of the virgin polymer is at least 2.25 after spinning. This relative viscosity corresponds to a molecular weight of about 22,000. Fibers prepared from nylon-4 with no higher molecular weight than this are suitable for many applications, but in most cases it is desirable to produce fibers from polymer with a relative viscosity after spinning of between 2.25 and 3.5, corresponding to molecular weights of between about 22,000 and 55,000. Fibers prepared from polymer having such higher molecular weights are suitable for nearly all textile applications.

When melt spinning is carried out on a technical or commercial scale, stabilizers antioxidants and spinning agents may be added. It should also be understood this new type of nylon-4 can also be processed in other ways, and applied to uses other than fibers and textiles. For example, it may be processed by spinning from solution or by pressing, and may be used for the production of film or other articles in addition to fibers.

The loss in weight of the polymer upon heating to the onset of thermal degradation can be determined by thermogravimetric analysis. In this analysis 0.1 gram of thoroughly dried polymer is heated from 20° C. to the onset of thermal degradation at a rate of 4° C. per minute, while the weight of sample is continuously recorded. A loss in weight of less than 5% in all indicates sufficient thermal stability, but preferably the polymer should show a loss in weight of less than 2.5% in this test.

The melting point of the new polymer is about 265° C. and decomposition starts at a temperature of about 270°–280° C. The temperature range between the melting point and the start of decomposition should be about 5° to 15° C. and partly depends upon the purity of the monomeric pyrrolidone used. The above temperature ranges and values can be determined by differential thermal analysis (DTA) using a heating rate of 4° C. per minute. The temperature at which thermal degradation starts here denotes the temperature at which the decomposition curve starts in the DTA diagram recorded at such heating rate of 4° C. per minute. In this particular determination, high-molecular weight, poly-2-pyrrolidone polymers prepared with carbon dioxide or sulphur dioxide as the accelerator may show about the same values, but in many cases the range between the melting point and the start of decomposition is slightly wider with the new polymer as compared to polymers prepared with carbon dioxide or sulphur dioxide as the accelerator.

The molecular-weight distribution of the new polymer is relatively narrow. The ratio between the weight-average molecular weight $M_w$ and the number-average molecular weight $M_n$ ranges between 1.0 and 3.5, and preferably between 1.0 and 3.0. Polymers having a high molecular weight, prepared using carbon dioxide or sulphur dioxide as the accelerator, have approximately the same or a slightly wider molecular weight distribution.

These new nylon-4 polymers can be prepared by polymerization of pyrrolidone with an anionic catalyst and N-(2-caprolactim)-caprolactam as an accelerator at a temperature of between 20° and 70° C. The polymerization can be carried out either in the mass (in bulk) or in an inert vehicle until a polymer with a relative viscosity of between 2.20 and 7.0 has been obtained. During this polymerization, water, alcohols and other interferring substances, including oxygen, are excluded to the extent possible.

The use of N-(2-caprolactim)-caprolactam (also less properly referred to as bis-ε-caprolactim ether) has previously been known to function as an accelerator in the anionic polymerization of caprolactam. However such caprolactam polymerization results in a polyamid having a wide molecular weight distribution (see U.S. Pat. No. 3,910,861). Since it is recognized in the literature that the spinnability of nylon-4 depends upon, and is enhanced by, a narrow molecular weight distribution, it is surprising to find that the poly-2-pyrrolidone of the present invention, prepared with N-(2-caprolactim)-caprolactam, is particularly suitable for melt spinning.

N-(2-caprolactim)-caprolactam can be prepared by reaction of caprolactam with phosgene or phosphorous oxychloride. See, for example, German Pat. No. 917669 and Chem. Ber. 94 (1961) 2278. This compound is used in the present process as an accelerator in an amount of between 0.05 and 5.0 mole percent relative to the pyrrolidone initially present, and preferably in an amount of between 0.1 and 2.0 mole percent. The molar ratio between catalyst and accelerator may be selected between 1:1 and 20:1. Generally, when the catalyst/accelerator ratio increases, the polymer yield decreases and the molecular weight of the resulting polymer increases. Preferably the catalyst/accelerator ratio should be in the range of between about 2:1 and 10:1.

Suitable catalysts for this polymerization include alkali lactamates and/or quaternary ammonium lactamates, or compounds that react in situ with the monomer to form such lactamates, such as alkali metal hydrides, oxides, hydroxides or alcoholates, or quaternary ammonium hydroxides or salts of quaternary ammonium compounds with an acid or acid compounds or combinations of these catalysts. The catalyst can be used in an amount of between 0.1 and 15 mole percent calculated with respect to the monomer, and preferably in an amount of between 1.25 and 10 mole percent.

The polymerization can be effected in the mass by bulk polymerization by keeping a liquid mixture of monomer, catalyst and accelerator at a temperature of between about 20° and 70° C. for 1 to 24 hours or longer if desired. However, good conversion can usually be obtained at a polymerization time of between 2 and 10 hours. If desired a crum-like product can be obtained by stirring during the polymerization. The mass polymerization can also be carried out in a ball mill. When the reaction mass has become solid is may be cut up into smaller particles, see for example Japanese Pat. No. 4706041.

Preferably, however, the polymerization is carried in an inert liquid vehicle in which both the monomer and the polymer are insoluble, or at most slightly soluble. The polymer obtained from such a slurry polymerization is in a granular form. Particularly suitable vehicles are aliphatic hydrocarbons, such as hexane, heptane, pentamethyl heptane and dodecane, or mixtures, such as gasoline with a boiling range of 80°–100° C. A polymer of higher molecular weight is achieved by slurry polymerization than by polymerization in the mass when equivalent amounts of catalyst and accelerator are used. Furthermore, the polymer powder resulting from slurry polymerization is easier to wash and dry. However, a slightly longer polymerization time, such as between 5 and 20 hours, is required to reach a comparable level of conversion in slurry polymerization.

The polymerization, both in the mass (bulk) and in slurry, may be carried out at a temperature of between 20° and 70° C., but best results with regard to viscosity and conversion are obtained at a temperature of between 40° and 60° C. The pressure during the polymerization appears to have little influence on the polymerization and the polymer produced so that atmospheric pressure is generally used. However, higher pressures may be used. The 2-pyrrolidone monomer used in this polymerization should preferably be purified to the extent possible using known techniques. Water, alcohols and other interferring substances, as well as oxygen, should also be excluded to the extent possible.

Upon completion of the polymerization the polymer should be thoroughly washed and dried in order to remove unconverted monomer and traces of catalyst. Here the use of N-(2-caprolactim)-caprolactam as the accelerator offers an additional advantage that washing can be effected with hot water without any previous neutralization, and the molecular weight of the polymer is not appreciably affected. By contrast, when carbon dioxide or sulphur dioxide are used as the accelerator, it is preferable to wash the polymer in a neutral or acid medium at room temperature, because the molecular weight is clearly reduced upon washing with hot water.

The relative viscosity of the product depends upon the amounts of catalyst and accelerator used. In order to obtain a product that can be spun into fibers, the relative viscosity of the polymer before spinning should be at least 2.2. Preferably, nylon-4 is prepared that has a relative viscosity of between about 3.0 and 6.0, although higher viscosities are also possible. The preparation of polymers of higher molecular weight, however, requires larger amounts of catalyst and accelerator, at the same molar ratio of catalyst to accelerator and, in the case of bulk polymerization, a shorter polymerization time.

The invention will be further elucidated by reference to the following examples.

EXAMPLE I

Polypyrrolidone was prepared by dispersing, with vigorous stirring, 100 parts by weight of 2-pyrrolidone (which had been purified by distillation) in 200 parts by weight of pentamethyl heptane and then adding 2.38 mole % of potassium pyrrolidonate and 0.80 mole % of N-(2-caprolactim)-caprolactam, both calculated with respect to the amount of 2-pyrrolidone.

The polymerization was continued for 60 hours at 25° C. with continuous stirring and with the exclusion of oxygen and moisture. After completion of the polymerization, the resulting polypyrrolidone was filtered, washed carefully with water, and dried. The relative viscosity was 4.74.

EXAMPLE II

The process of Example I was repeated, but using 4.82 mole % of potassium pyrrolidonate and 0.83 mole % of N-(2-caprolactim)-caprolactam, and a temperature of 52° C. and a polymerization time of 24 hours. This resulted in a polypyrrolidone with a relative viscosity of 2.84. The conversion was 78%, and the $M_w/M_n$ molecular weight distribution was 2.0.

EXAMPLE III

The process of Example I was repeated but at a temperature of 50° C. The amounts of catalyst (potassium pyrrolidonate) and N-(2-caprolactim)-caprolactam, and the polymerization time, the degree of conversion and the relative viscosity ($\eta_{rel}$) of the resulting polymers are compiled in Table I. Each mole % in the following tables is expressed as a percent of 2-pyrrolidone monomer initially present.

TABLE I

| experiment | catalyst moles % | accelerator moles % | time h | conversion % | $\eta_{rel}$ |
|---|---|---|---|---|---|
| 3 | 5.0 | 2.0 | 4 | 65 | 2.24 |
| 4 | 5.0 | 1.0 | 4 | 76 | 2.54 |
| 5 | 2.5 | 1.0 | 23 | 80 | 2.67 |
| 6 | 4.8 | 0.84 | 24 | 70 | 2.53 |

EXAMPLE IV

Polypyrrolidone was prepared by means by mass polymerization by mixing 2-pyrrolidone, catalyst (potassium pyrrolidonate) and N-(2-caprolactim)-caprolactam, and allowing the mixture to polymerize in plastic cylinders for 23 hours at 50° C. with the exclusion of oxygen and moisture. The polymer thus obtained was ground, extracted with water and dried. The experimental data are compiled in table 2.

TABLE 2

| experiment | catalyst moles % | accelerator moles % | conversion % | $\eta_{rel}$ |
|---|---|---|---|---|
| 7 | 5.0 | 0.5 | 66.5 | 2.23 |
| 8 | 4.06 | 0.5 | 66.5 | 2.23 |
| 9 | 3.6 | 0.5 | 66 | 2.31 |
| 10 | 4.75 | 0.26 | 61 | 2.90 |

EXAMPLE V

A number of reference polymers were prepared by suspension polymerization in a manner similar to the process in Example I, or by mass polymerization in a manner similar to the process of Example IV. The conditions used, and the characteristics of the polymer obtained are as follows:

Polymer A. Mass polymerization at 50° C. for 72 hours with 0.45 mole % of N-acetyl pyrrolidone and 5.4 mole % of potassium pyrrolidonate yielded a polymer with a $\eta_{rel}$ of 9.4.

Polymer B. Mass polymerization of 50° C. for 24 hours with 0.30 mole of $CO_2$/mole of catalyst and 5.4 mole % of potassium pyrrolidonate yielded a polymer with a $\eta_{rel}$ of 66 and $M_w/M_n$ molecular weight distribution of 3.6.

Polymer C. Mass polymerization at 50° C. for 5 hours with 0.40 mole of $SO_2$ and 5.0 mole % of potassium pyrrolidonate yielded a polymer with a $\eta_{rel}$ of 25.2.

Polymer D. Suspension polymerization at 50° C. for 5 hours with 0.50 mole % of $SO_2$ and 5.0 mole % of potassium pyrrolidonate yielded a polymer with a $\eta_{rel}$ of 25.2.

These polymers A–D and the polymer obtained in Example II were subjected to a thermogravimetric analysis (TGA) and a differential thermal analysis (DTA).

In the TGA examination a thoroughly dried polymer sample was heated from room temperature to a temperature of 325° C. under a nitrogen atmosphere at the rate of 10° C. per minute, while the weight of sample was continuously determined. A total loss in weight of less than 5% was rated "good" in this examination, a loss in weight of between 5 and 15% "moderate", and a loss of over 15% "poor."

In the DTA examination a thoroughly dried polymer sample was slowly heated from room temperature to 325° C. under a nitrogen atmosphere, while the heat absorbed or given off by the sample was continuously recorded. If the recorded graph of a thermostable polymer shows a separate melting curve and a separate decomposition curve, the polymer is rated "good." If the decomposition curve of a polymer partly coincides with the melting curve, it is rated "moderate." If the decomposition curve of a polymer virtually completely coincides with the melting curve, the polymer is rated "poor," and if only one curve can be observed, the polymer is rated "very poor." The DTA examination was carried out once at a heating rate of 4° C./minute and once at a heating rate of 10° C./minute. The behavior in the temperature range of 250° to 290° C., and particularly between 270° and 290° C., is most relevant, as the polymer is also spun in this temperature range. At a heating rate of 10° C./minute this most relevant range is traversed in 2 minutes and at 4° C./minute in 5 minutes. The latter value gives the best approximation to the residence time in the melting equipment, so that most importance is attached to the DTA examination at a heating rate of 4° C./minute. The results of the DTA and the TGA examination are compiled in Table 3.

TABLE III

| polymer | TGA | DTA 10° C./m | DTA 4° C./m |
|---|---|---|---|
| A | good | poor | very poor |
| B | good | good | moderate |
| C | good | good | moderate |
| D | moderate | good | poor |
| Ex. II | good | good | good |

The melting curve in the 10° C./minute diagram of the polymer obtained in Example II starts at 250° C. with a peak at 276° C., while the decomposition curve starts at 286° C. with a peak at 310° C. In the 4° C./minute diagram the peak of the melting curve for this polymer is at 266° C., while the decomposition curve starts at 275° C.

EXAMPLE VI

The suspension polymerization process according to Example I was repeated with different amounts of catalyst and accelerator and different polymerization times. Experiments 11 through 18 were carried out at 50° C. and experiment 19 at 30° C. The results are compiled in Table 4. These experiments show that a smaller amount of polymer with a higher molecular weight is obtained at a lower polymerization temperature (experiments 15 and 19). It is also clear that more catalyst gives rise to a higher molecular weight.

TABLE 4

| Experiment | Catalyst moles % | Accelerator moles % | Time h | Conversion % | $\eta_{rel}$ |
|---|---|---|---|---|---|
| 11 | 1.80 | 0.450 | 18 | 65 | 3.2 |
| 12 | 2.50 | 0.625 | 8 | 48 | 3.4 |
| 13 | 3.75 | 0.940 | 3.5 | 48 | 4.0 |
| 14 | 2.50 | 0.625 | 16 | 75 | 3.2 |
| 15 | 2.50 | 0.625 | 10.5 | 58 | 3.2 |
| 16 | 2.50 | 0.400 | 24 | 75 | 5.7 |
| 17 | 2.50 | 0.250 | 24 | 71 | 6.6 |
| 18 | 3.75 | 1.130 | 1.5 | 36 | 3.5 |
| 19* | 2.50 | 0.625 | 10.5 | 33 | 5.0 |

*polymerization temperature 30° C.

EXAMPLE VII

Bulk or mass polymerization was effected in the way described in Example IV at 50° C. using different amounts of catalyst and accelerator and different times. The results are compiled in Table 5. Experiments 22–24 were carried out with a standard polymerization time of 24 hours, but experiments 20, 21, and 25 show that a favorable conversion can already be achieved in a considerably shorter period.

TABLE 5

| Experiment | Catalyst moles | Accelerator moles % | Time h | Conversion % | $\eta_{rel}$ |
|---|---|---|---|---|---|
| 20 | 2.50 | 0.625 | 8 | 70 | 3.1 |
| 21 | 1.80 | 0.450 | 8 | 54 | 3.1 |
| 22 | 1.80 | 0.450 | 24 | 80 | 2.7 |
| 23 | 1.50 | 0.300 | 24 | 85 | 3.2 |
| 24 | 1.50 | 0.300 | 24 | 48 | 4.4 |
| 25 | 5.00 | 1.250 | 1.5 | 51 | 3.2 |
| 26 | 2.50 | 0.625 | 22 | 71 | 2.6 |

EXAMPLE VIII

Polypyrrolidone was prepared in the way described in Example IV by mass polymerization of 1000 grams of pyrrolidone with 1.50 mole % of potassium pyrrolidonate and 0.30 mole % of N-(2-caprolactim)-caprolactam at 50° C. and for a period of 48 hours. The nylon-4 obtained after grinding, washing and drying had a relative viscosity of 3.0. The conversion was 76%.

DTA and TGA examinations, both effected with 0.1 gram of polymer and with a heating rate of 4° C. per minute, showed that the melting point was at 263° C. and that degradation sets in at 273° C. The loss in weight upon heating to 273° C. was 1.89% by weight. 500 odd grams of the finely ground and thoroughly dried polymer were spun on the LSM ex. 13/24 D melt-spinning machine (make Fourné GmbH at Bonn). The spinning of this polymer into a white thread proceeded well at a production rate of 14 g/min. A 13 mm extruder with a length/diameter ratio of 24 was used at 90 revolutions per minute. The spinneret was of the 1×8×0.50 type. The temperature gradient ranged from 170° C. at the entrance to 270° C., with the temperature of the polymer in the spinneret being 270° C. The filament was cold-drawn four times. The resulting product of 16.5 dtex had a strength of 3.0 cN/dtex and an elongation at rupture of 42%. The relative viscosity of the spun polymer was 2.35.

What is claimed is:

1. In a process for the preparation of polypyrrolidone by polymerization of 2-pyrrolidone monomer in contact with an anionic catalyst and an accelerator, the improvement wherein said accelerator is N-(2-caprolactim)-caprolactam in an amount of between 0.05 and 5.0 mole percent relative to said monomer, and the polymerization is carried out at a temperature of between about 25° and 70° C. until a relative viscosity of at least 2.2, measured at 20° C. on a solution of 1 gram of polymer in 100 ml of 96% sulphuric acid, is obtained.

2. The improved process of claim 1 wherein an amount of between 0.1 and 2.0 mole percent of N-(2-caprolactim)-caprolactam is used.

3. The improved process of claim 1 or 2 wherein the molecular ratio between said catalyst and said N-(2-caprolactim)-caprolactam accelerator is between 2:1 and 10:1.

4. The improved process of claim 3 wherein said polymerization is carried out until a polymer with a relative viscosity of between 3.0 and 6.0 is prepared.

5. The improved process of claim 4 wherein the polymerization is carried out in a liquid vehicle in which neither the monomer nor the polymer is soluble.

* * * * *